US006970863B2

(12) United States Patent
Cragun et al.

(10) Patent No.: US 6,970,863 B2
(45) Date of Patent: Nov. 29, 2005

(54) FRONT-END WEIGHT FACTOR SEARCH CRITERIA

(75) Inventors: Brian John Cragun, Rochester, MN (US); Paul Reuben Day, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 437 days.

(21) Appl. No.: 09/954,884

(22) Filed: Sep. 18, 2001

(65) Prior Publication Data

US 2003/0055810 A1   Mar. 20, 2003

(51) Int. Cl.[7] ............................................. G06F 17/00
(52) U.S. Cl. ........................ 707/3; 707/100; 707/102; 707/104.1
(58) Field of Search .............................. 707/10, 6, 7, 9, 707/1–5, 100–104.1

(56) References Cited

U.S. PATENT DOCUMENTS

| | | | | |
|---|---|---|---|---|
| 5,953,718 | A * | 9/1999 | Wical | 707/5 |
| 6,272,467 | B1 * | 8/2001 | Durand et al. | 705/1 |
| 6,353,825 | B1 * | 3/2002 | Ponte | 707/5 |
| 6,598,040 | B1 | 7/2003 | Cragun et al. | |
| 6,697,802 | B2 * | 2/2004 | Ma et al. | 707/6 |
| 6,742,001 | B2 * | 5/2004 | Ripley | 707/104.1 |

OTHER PUBLICATIONS http://help.altavista.com/search/faq, Sep. 5, 2001 12:48PM, pp. 1-5.
The Zen of Denix: Denix WebSearch, Todd Littell, http://www.cecer.army.mil/EARUpdate/NLFiles/2001/DSE.cfm, Sep. 5, 2001 1:10 PM, pp. 1-4.

* cited by examiner

Primary Examiner—Alford Kindred
Assistant Examiner—Sana Al-Hashemi
(74) Attorney, Agent, or Firm—Moser, Patterson & Sheridan, LLP

(57) ABSTRACT

Methods and apparatuses for locating electronic documents by allowing a user to specify, prioritize and control the order of a resulting hit list at the front end of a search are provided. One embodiment provides a method for searching electronic documents, comprising: receiving a search expression including one or more search terms having one or more weight criteria, wherein the one or more weight criteria include a user designated score modifier; finding one or more candidate documents based on the search expression; calculating a score for each candidate document according to the one or more weight criteria; and transmitting information for displaying a list of the one or more candidate documents reflecting the calculated scores. The weight criteria may be selected from a location of the one or more search terms, a format of the one or more search terms, and a frequency count of the one or more search terms.

37 Claims, 4 Drawing Sheets

| EVALUATE CRITERION 500 | |
|---|---|
| IF CRITERION IS: 510 | SET BOOLEAN RESULT TRUE IF: 520 |
| PRESENCE 522 | WORD IS PRESENT IN DOCUMENT 524 |
| MULTIPLES 526 | WORD IS PRESENT MORE THAN ONCE IN DOCUMENT 528 |
| MINIMUM(n) 532 | WORD IS PRESENT AT LEAST n TIMES IN DOCUMENT 534 |
| BOLD 536 | WORD IS CONTAINED IN BOLD MARK-UPS 538 |
| ITALIC 542 | WORD IS CONTAINED IN ITALIC MARK-UPS 544 |
| COLOR 546 | WORD HAS DIFFERENT COLOR THAN MOST WORDS IN THE DOCUMENT OR PARAGRAPH 548 |
| FONTSIZE 552 | WORD HAS DIFFERENT FONT SIZE THAN MOST WORDS IN THE DOCUMENT OR PARAGRAPH 554 |
| FONTFACE 556 | WORD HAS DIFFERENT FONT TYPE THAN MOST WORDS IN THE DOCUMENT OR PARAGRAPH 558 |
| HEADER 562 | WORD IS PART OF HEADER TEXT 564 |
| CAPTION 566 | WORD IS CONTAINED WITHIN A CAPTION OR AS ALTERNATE TEXT OF AN IMAGE 568 |
| ABSTRACT 572 | WORD IS CONTAINED IN THE ABSTRACT INFORMATION 574 |
| FOOTNOTE 576 | WORD IS PART OF FOOTNOTE TEXT 578 |
| SUMMARY 582 | WORD IS PART OF A PARAGRAPH LABELED AS THE SUMMARY 584 |
| TITLE 586 | WORD IS PART OF TITLE 588 |

*Fig. 5*

FRONT-END WEIGHT FACTOR SEARCH CRITERIA

BACKGROUND OF THE INVENTION

1. Field of the Invention

The present invention generally relates to data processing and utilization of data processing systems to locate desired data. More particularly, the present invention relates to methods and systems for locating electronic documents.

2. Description of the Related Art

The World Wide Web (i.e. the Web) denotes a vast set of interlinked documents (i.e., Web pages) residing on various data processing systems around the globe. In recent years, the Web has experienced rapid growth, to the point that the Web now contains millions of documents. The data processing systems that serve up these documents on request are called servers, and when a data processing system is utilized to retrieve a document from a server, the retrieving data processing system is considered a client.

In general, the interlinked documents are publicly accessible and are retrieved using the communications protocols known as "HTTP" (which stands for Hypertext Transfer Protocol) and "TCP/IP" (which stands for Transmission Control Protocol/Internet Protocol). The servers, communications networks and related facilities that provide access to the documents of the Web are known collectively as the Internet.

In addition to Web documents, a number of services are also available via the Internet, including search engines, which help users to identify which of the millions of Web documents relate to particular subjects of interest. Typically, a search engine includes a Web page that serves as a user interface through which a user enters a search expression, a database that associates Web page addresses with Web page content, and a comparator that determines which of the Web pages in the database include content corresponding to the entered search expression. The addresses of the corresponding Web pages are returned in what is called a "hit list." For example, if a user were to enter a search expression consisting of a particular word, the resulting hit list would provide the addresses of Web pages containing that word.

However, search expressions utilizing a list of words relating to a subject often cause search engines to produce inefficient hit lists (i.e., hit lists that include unhelpful sites and/or that fail to include a reasonably large number of helpful sites). For instance, a user wanting to identify Web pages with substantive content concerning World War II might enter the search expression "World War II." The search engine would then return a hit list of Web pages containing the entered words. In addition to the hits with the desired substantive content, however, the hit list will likely also contain hits with no substantive content relating to the subject in question, such as hits identifying Web pages with mere advertisements for books on the subject. Unless one is looking for a book, the hits relating to mere book advertisements get in the way because they show up in the hit list but generally do not answer any substantive questions or provide any significant amount of substantive information regarding the subject of interest. In addition, due to the large number of Web pages now in existence, overbroad hit lists often identify substantially more Web pages than a user can conveniently explore.

Obtaining efficient hit lists is one of the biggest challenges associated with utilizing the Web. To address this challenge, many search engines allow users to enter searches, known as "Boolean searches," that are more complex than a simple list of words. In a Boolean search, the user enters Boolean operators along with the words of the search expression. Among the most common Boolean operators is AND, OR, and NOT. Furthermore, according to the syntax utilized by some search engines, AND, OR, and NOT may be abbreviated as &, I, and I, respectively. Also, OR is generally the default operator (which means that a search expression containing words but no explicit Boolean operators is interpreted as if those words were joined with the OR operator). Quotation marks also act as Boolean operators, allowing the user to group words into a phrase. Such a phrase produces a match only when that same phrase (i.e., all of the words in the same arrangement) is found in a Web page.

Some search engines also support "include" and "exclude" Boolean operators, which may be entered as + and −, respectively. If a word is qualified with the include operator, a document is a match only if the document includes that word. If a word is qualified with the exclude operator, a document is a match only if the document does not include that word. In addition, parentheses may be utilized to group pieces of a search expression together, for instance, to associate an include operator with one group of words but not another.

By utilizing Boolean expressions, skilled database searchers are able to obtain more efficient hit lists. However, substantial effort may be required to formulate and enter a search expression that is sufficiently complete to obtain a reasonably efficient hit list. Furthermore, the user is unable to specify, prioritize and control the order of the resulting hit list at the front end of the search (e.g., as part of the search expression). Therefore, there exists a need for a more effective way to generate efficient hit lists. Particularly, there exists a need for methods and systems for locating electronic documents which allow a user to specify, prioritize and control the order of the resulting hit list at the front end of the search.

SUMMARY OF THE INVENTION

Embodiments of the invention generally provide methods and systems for locating electronic documents by allowing a user to specify, prioritize and control the order of a resulting hit list at the front end of a search.

One embodiment provides a method for searching electronic documents, comprising: receiving a search expression including one or more search terms having one or more weight criteria, wherein the one or more weight criteria include a user designated score modifier; finding one or more candidate documents based on the search expression; calculating a score for each candidate document according to the one or more weight criteria; and transmitting information for displaying a list of the one or more candidate documents reflecting the calculated scores. The weight criteria may be selected from a location of the one or more search terms, a format of the one or more search terms, and a frequency count of the one or more search terms.

The search expression may include one or more weight criteria which require that the one or more search terms are located in a section selected from a header section, a caption section, an abstract section, a footnote section, a summary section, and a title section. The search expression may also include one or more weight criteria which require that one or more search terms have a format that is different from a common format of the candidate document. The format may be selected from bold, italic, color, font size and font type. Furthermore, the search expression may include one or more weight criteria which require that a search term be present in the candidate document at least once, more than once, or at least a minimum number of times.

Other embodiments provide a signal bearing medium and a system for performing the steps in the above methods for searching electronic documents.

Another embodiment provides a method for searching electronic documents, comprising: receiving a search expression including one or more search terms having one or more format criteria; finding one or more candidate documents based on the search expression; and transmitting information for displaying a list of the one or more candidate documents reflecting the calculated scores.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 5 is a table illustrating one embodiment of an evaluate criterion process 500.

DETAILED DESCRIPTION OF THE PREFERRED EMBODIMENT

Embodiments of the invention generally provide methods and systems for locating electronic documents by allowing a user to specify, prioritize and control the order of a resulting hit list at the front end of a search.

One embodiment of the invention is implemented as a program product for use with a computer system such as, for example, the network environment 10 and the server 20 shown in FIGS. 1–2 and described below. The program(s) of the program product defines functions of the embodiments (including the methods described below with reference to FIGS. 3–5) and can be contained on a variety of signal/bearing media. Illustrative signal/bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive and volatile random access memory (RAM) such as DRAM, SRAM and MRAM); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, whether implemented as part of an operating system or a specific application, component, program, module, object, or sequence of instructions may be referred to herein as a "program". The computer program typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Figure 1:
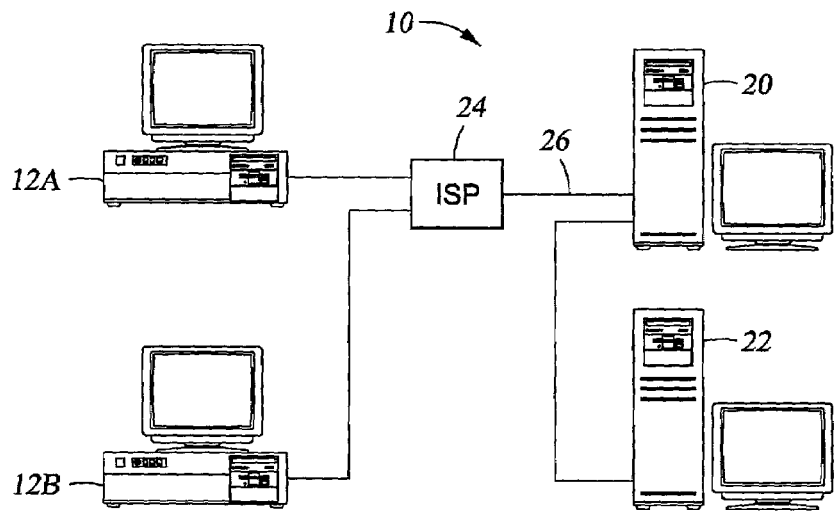
FIG. 1 illustrates an exemplary collaborative data processing environment or network 10.

FIG. 1 illustrates an exemplary collaborative data processing environment or network 10. The network 10 may be a wide area network (WAN) or a local area network (LAN). Network 10 includes two clients 12A and 12B and two servers 20 and 22. Clients 12A and 12B obtain connections to server 20 via an intermediate data processing system, such as an Internet service provider (ISP) 24. Alternatively, the clients 12A and 12B may be directly connected to one another. In one embodiment, clients 12A and 12B may utilize the TCP/IP and HTTP protocols to communicate with servers 20 and 22 over communications media 26 (which may include such media as twisted-pair cables, coaxial cables, telephone lines, optical fibers, microwave links, and/or radio links).

In one embodiment, network 10 is a portion of the Internet, with clients 12A and 12B and servers 20 and 22 being connected to, or capable of connecting with, many additional clients and servers. As described in greater detail below, in the illustrative embodiment, server 22 contains publicly accessible Web pages, and server 20 includes a publicly accessible search engine. Also, each of clients 12A and 12B includes a Web browser with facilities for accepting and storing "cookies" from, and returning cookies to, Web servers (such as server 20).

As recognized by those of ordinary skill in the art, a cookie is a data item relating to a Web page that a Web server causes to be stored on a client. In accordance with the HTTP protocol, the cookie is automatically returned to the Web server by the client whenever the client subsequently accesses the Universal Resource Locator (URL) corresponding to that Web page. Servers commonly utilize cookies to identify clients, for example so that repeat users may be recognized.

Figure 2:
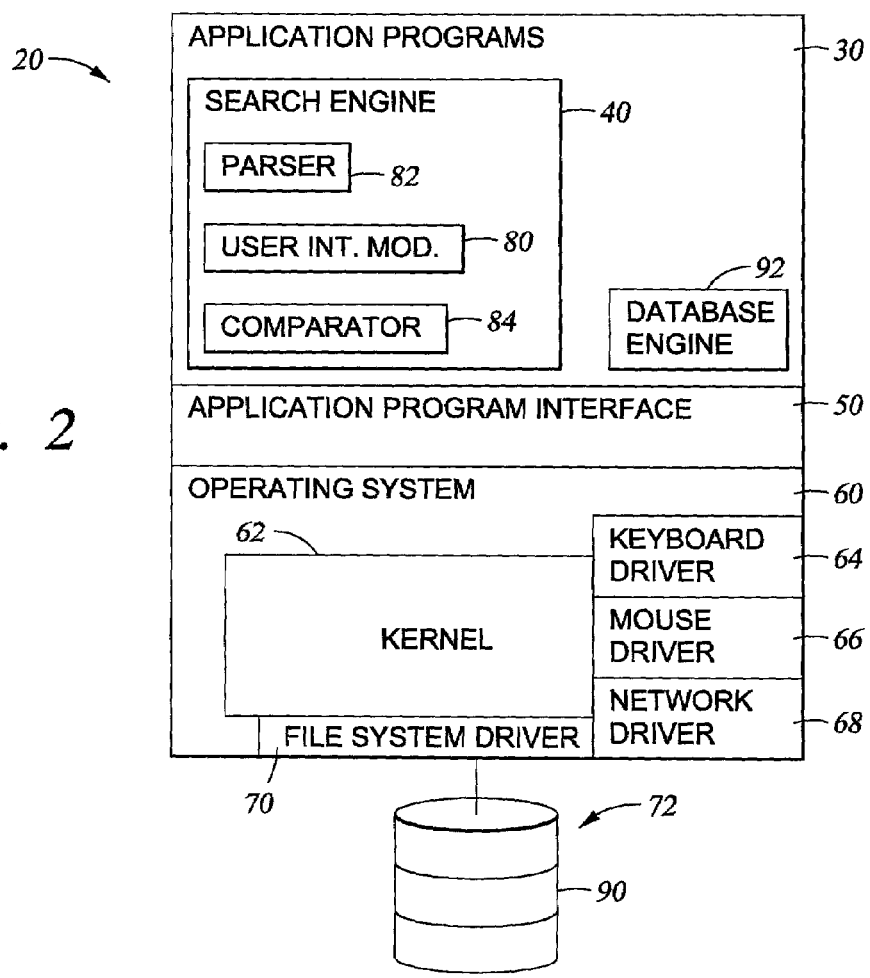
FIG. 2 illustrates a layer diagram of one embodiment of the software of server 20.

FIG. 2 illustrates a layer diagram of one embodiment of the software of server 20. At the lowest level of the diagram is the operating system 60, which manages the operations of server 20 by performing duties such as resource allocation, task management, and error detection. Operating system 60 also provides tools for managing communications between server 20 and remote data processing systems (such as clients 12A and 12B). Included in operating system 60 is a kernel 62 that manages the memory, files and peripheral devices of server 20. The lowest level also includes device drivers, such as a keyboard driver 64, a mouse driver 66, a network driver 68, and a file system driver 70, which kernel 62 utilizes to manage input from and output to peripheral devices, communication ports and storage media (such as disk drive 72). At the intermediate level is an application program interface (API) 50, through which application programs 30 request services from operating system 60. The highest level of the diagram contains the application programs 30, which include the search engine 40.

The primary functions of search engine 40 include receiving search requests from users and, in response, returning hit lists identifying Web pages corresponding to the received search requests. Search engine 40 contains a number of components that operate cooperatively to perform those functions. One of those components is a user interface module 80, which generates the Web pages that are presented to the user as the interface to search engine 40. Another component is a parser 82, which translates or decodes search expressions received from the user.

In addition, search engine 40 includes a comparator 84 that determines which documents match the search expression. In the one embodiment, the determination is made by reference to a database 90, which associates the addresses of numerous Web pages (including Web pages stored on server 22) with the content of those Web pages. For instance, database 90 may contain summaries of, excerpts from, and/or keywords associated with those Web pages. In one embodiment, database 90 includes this kind of information for millions of Web pages on hundreds or thousands of Web servers, and comparator 84 utilizes the services of a database engine 92 to obtain the required information from database 90. In the illustrative embodiment database 90 is stored on disk drive 72; however, database 90 could as well be stored entirely or partially in CD-ROM drives, in memory, or on any other appropriate medium or combinations of media (including storage media of one or more additional data processing system). In addition, the database 90 and/or database engine 92 need not reside on the same machine as the search engine 40, but may instead be remotely located and accessed via well-known communication facilities and methods. In any case, once the matching documents are identified, a hit list identifying those documents is returned to the user by user interface module 80. In another embodiment, the functions and features described herein are made available in a local environment, and a search may be performed by a user operating the server 20, rather than a remote machine.

Figure 3:
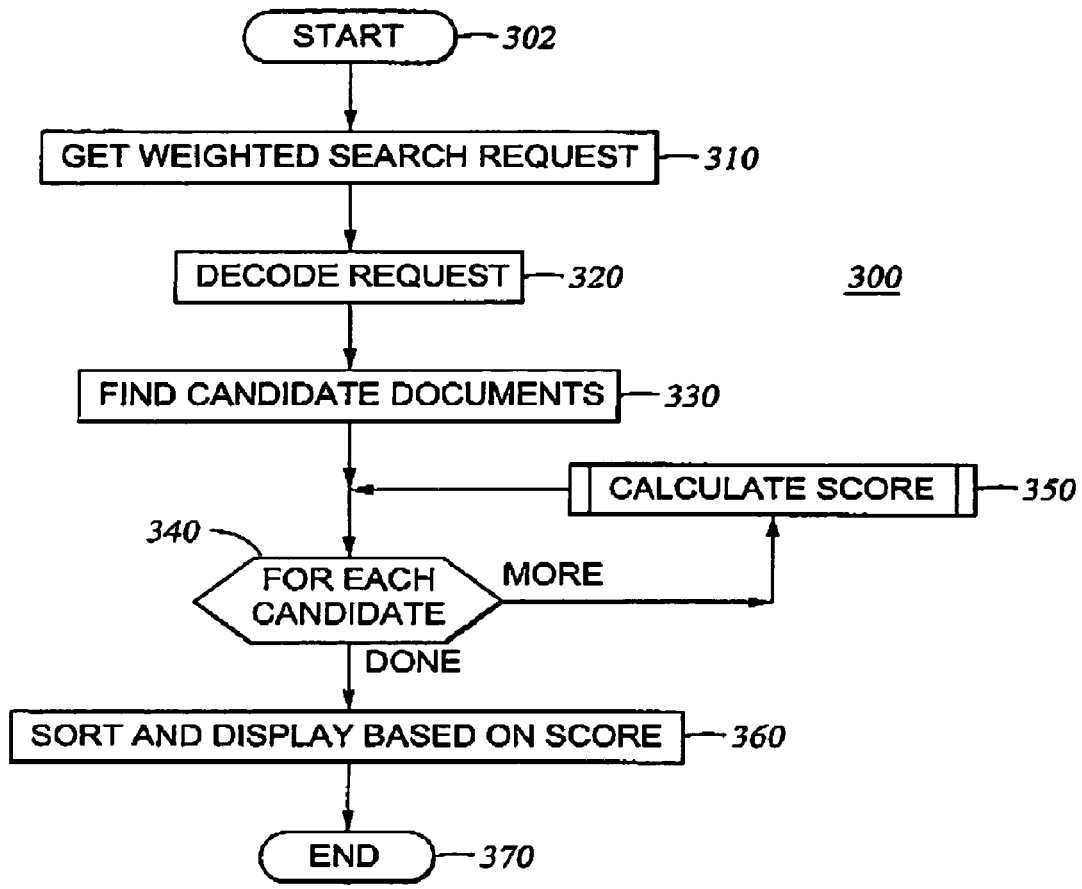
FIG. 3 is a flow diagram illustrating one embodiment of a process 300 for performing a search of electronic documents utilizing weighted search requests.

FIG. 3 is a flow diagram illustrating one embodiment of a process 300 for performing a search of electronic documents utilizing weighted search requests. The process 300 may be performed utilizing a search engine such as search engine 40 described above in FIG. 2. The process 300 begins a step 302 and proceeds to get a weighted search request at step 310. The weighted search request may be input by a user through a graphical user interface such as a web page on a search engine web site. The weighted search request may be a search expression including one or more search terms having one or more weight criteria. Each weight criterion may be associated with a score modifier which provides a user-designated weight to the weight criterion. For example, a user may input a high value for a score modifier associated with a weight criterion for a search term that is in bold format in a candidate document.

In one embodiment, a search expression may be may be entered in the form of a search term followed in parentheses by a weight criterion and a corresponding score modifier, e.g., search_term(weight_criterion:score_modifier). In another embodiment, the search expression may include a plurality of search terms connected through Boolean operators, such as AND, OR, NOT, etc., and one or more search terms may be followed in parentheses by one or more weight criteria and one or more corresponding score modifiers, e.g., first_search_term(first_weight_criterion:first_score_modifier) AND second_search_term(second_weight_criterion:second_score_modifier; third_weight_criterion:third_score_modifier).

In one embodiment, the weight criteria utilized by the search engine may be categorized into the following categories: the format of the search term, the location of the search term in the candidate document, and the occurrence frequency of the search term in the candidate document. The weight criteria in the format category may include BOLD, ITALIC, COLOR, FONTSIZE, FONTFACE, and other format indicators. The weight criteria in the location category may include HEADER, CAPTION, ABSTRACT, FOOTNOTE, SUMMARY, TITLE, and other location indicators. The occurrence frequency category may include PRESENCE, MULTIPLES, MINIMUM(n) and other occurrence frequency indicators.

The weight criterion BOLD may be utilized to determine whether the found search term has bold formatting in the candidate document. Additionally, the weight criterion BOLD may require that the search term is not located in a title section or in a heading in the candidate document. Furthermore, the weight criterion BOLD may require that the search term is not located in a paragraph or within a section where a significant portion of the text (e.g., twenty words adjacent the location of the found search term) also has bold formatting.

The weight criterion ITALIC may be utilized to determine whether the found search term has italicized formatting in the candidate document. Additionally, the weight criterion ITALIC may require that the search term is not located in a title section or in a heading in the candidate document. Furthermore, the weight criterion ITALIC may require that the search term is not located in a paragraph or within a section where a significant portion of the text (e.g., twenty words adjacent the location of the found search term) also has italicized formatting.

The weight criterion COLOR may be utilized to determine whether the found search term has a different text color than a common text color of the paragraph containing the found search term or a majority of the text in the candidate document. Additionally, the weight criterion COLOR may be utilized to determine whether the found search term has a different background color than a common background color of the paragraph containing the found search term or a majority of the text in the candidate document. In one embodiment, a common color (either text color or background color) may be defined as a color used by at least 20% of the paragraph having the found search term or 20% of the text in the candidate document. A paragraph typically has one common text color and one common background color while a document may have more than one common text color and more than one common background color.

The weight criterion FONTSIZE may be utilized to determine whether the found search term has a different font size than a common font size of the paragraph containing the found search term or the text in the candidate document. In one embodiment, a common font size may be defined as a font size used by at least 20% of the paragraph having the found search term or 20% of the text in the candidate document. A paragraph typically has one common font size while a document may have more than one common font size.

The weight criterion FONTFACE may be utilized to determine whether the found search term has a different font type than the common font type of the paragraph containing the found search term or a majority of the text in the candidate document. In one embodiment, the common font type may be defined as the font type used by at least 20% of the paragraph having the found search term or 20% of the text in the candidate document. A paragraph typically has one common font type while a document may have more than one common font type.

The weight criterion HEADER may be utilized to determine whether the found search term is located in a header section of the candidate document. Similarly, the weight criterion FOOTNOTE may be utilized to determine whether the found search term is located in a footnote section of the candidate document.

The weight criterion CAPTION may be utilized to determine whether the found search term is located in a caption section of the candidate document. The weight criterion CAPTION may also be utilized to determine whether the found search term is contained in an alternate image text.

The weight criterion ABSTRACT may be utilized to determine whether the found search term is located in an abstract section of the candidate document. Also, the weight criterion ABSTRACT may be utilized to determine whether the found search term is located in a paragraph following a header containing the word "abstract" or in a paragraph having the word "abstract" located at the beginning of the paragraph (e.g., first three words of the paragraph). Alternatively, the weight criterion ABSTRACT may be utilized to determine whether the found search term is located in an abstract metadata (i.e., a description of abstract data or data included with an electronic document which provides keywords, bibliographic information and/or abstract about the electronic document) of the candidate document.

The weight criterion SUMMARY may be utilized to determine whether the found search term is located in a summary section of the candidate document. Also, the weight criterion SUMMARY may be utilized to determine whether the found search term is located in a paragraph following a header containing the word "summary" or in a paragraph having the word "summary" located at the beginning of the paragraph (e.g., first three words of the paragraph).

The weight criterion TITLE may be utilized to determine whether the found search term is located in a title section of the candidate document. Alternatively, the weight criterion TITLE may be utilized to determine whether the found search term is located in a title meta-data (i.e., a description of title data or data included with an electronic document which provides keywords, bibliographic information and/or abstract about the electronic document) of the candidate document.

The weight criterion PRESENCE may be utilized to determine whether the search term is found in the candidate document. In one embodiment, the weight value or score modifier is set to default to 1, and the score for having the search term present at least once equals the weight value.

The weight criterion MULTIPLES may be utilized to determine whether the search term is found more than once in the candidate document. In one embodiment, the weight value or score modifier is set to default to 1, and the score for having the search term present more than once equals the weight value multiplied by the number of occurrence of the search term in the candidate document.

The weight criterion MINIMUM(n) may be utilized to determine whether the search term is found at least n times in the candidate document. The score for having the search term present at least n times equals the designated weight value.

Referring back to FIG. 3, after receiving the weighted search request, the process 300 proceeds to decode the weighted search request at step 320. In one embodiment, the weighted search request may be decoded as a Boolean expression including one or more search terms, weight criteria, and Boolean operators. The process 300 then finds candidate documents based on the Boolean expression at step 330. The process 300 enters a do-loop at step 340 to calculate a weighted score for each candidate document, and a weighted score is calculated for each candidate document based on the weight criteria and the associated score modifier at step 350, which is detailed below with reference to FIG. 4. After a weighted score is calculated for each candidate document, the process 300 sorts the candidate documents according to the calculated score and transmits information for displaying the list of candidate documents at step 360, and the process 300 ends at step 370. In one embodiment, the search result (e.g., candidate documents with weighted scores) may be displayed in descending order starting with the document with the highest score. In another embodiment, the search result may display each candidate document with an itemized score showing the subscore for each weight criterion.

In another embodiment, at step 360, the process 300 may sort the candidate documents based on one or more weight criteria. For example, the candidate documents may be sorted into a plurality of lists wherein each list includes candidate documents that satisfy one particular weight criterion. In yet another embodiment, the process 300 may sort the candidate documents based on one or more default or pre-designated weight criteria. For example, the process 300 may sort the candidate documents based on a default weight criterion, e.g., TITLE criterion, and the candidate documents are sorted based on whether the search term is found in a title section of a candidate document. In another example, the process 300 may calculate a format score, wherein the format score reflects formatting attributes in the user-specified search terms. The documents may then be sorted to produce a list having a document order at least partially reflecting the calculated format score.

In one embodiment, the find candidate documents step 330 may find candidate documents utilizing only the search terms and Boolean operators (i.e., without utilizing the weight criteria), as commonly performed by typical search engines, to reduce the total search time. In this case, the search may produce substantially more candidate documents than a search utilizing the weight criteria in addition to the search terms and Boolean operators. However, the search time may be substantially reduced even with the additional time required to calculate scores for the additional candidate documents. In another embodiment, the process 300 may be performed for a relatively small database, and the process 300 may find candidate documents utilizing the search terms and Boolean operators as well as the weight criteria without substantially increasing the time required to perform the search.

Figure 4:
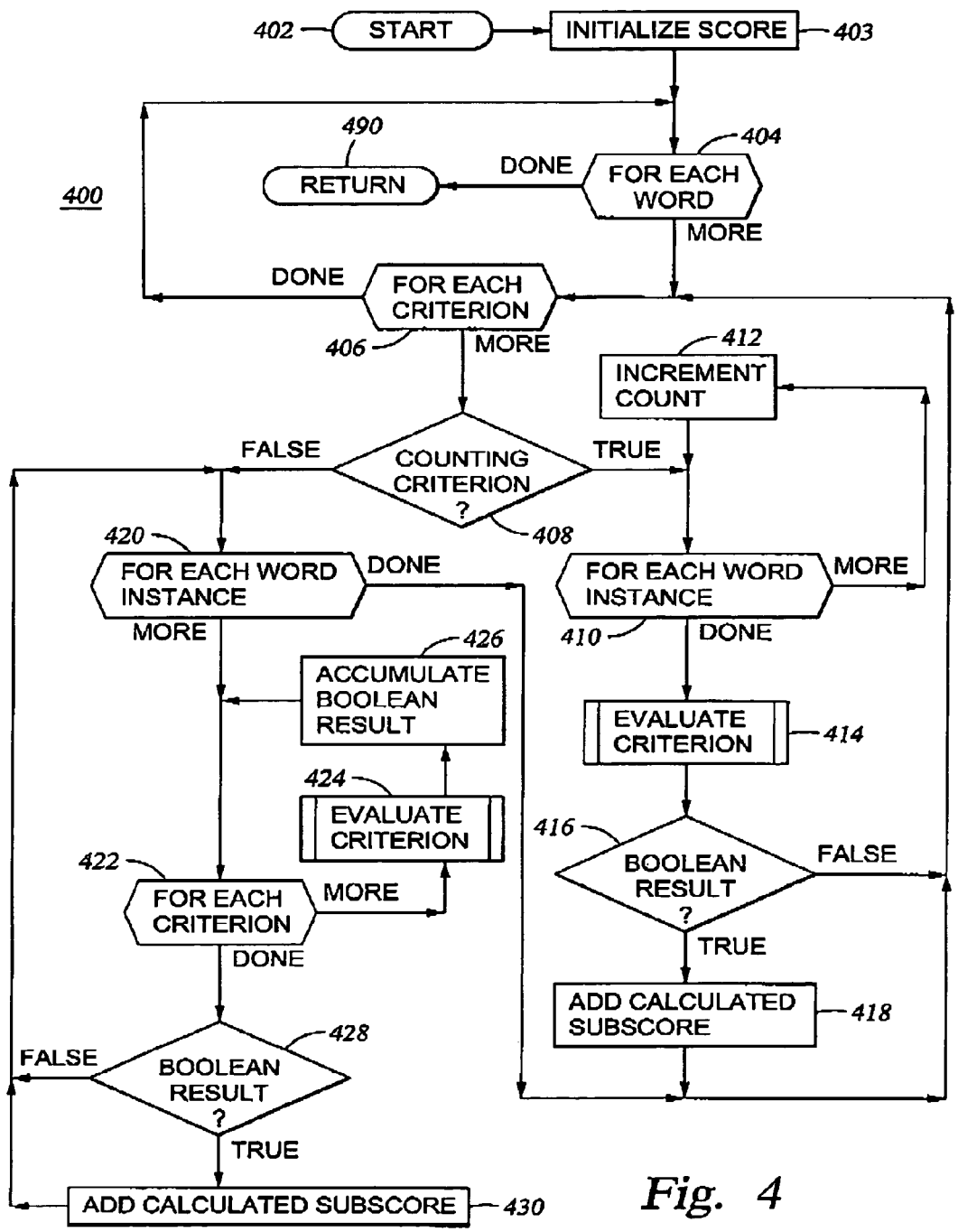
FIG. 4 is a flow diagram illustrating one embodiment of a process 400 for calculating a weighted score for a candidate document.

FIG. 4 is a flow diagram illustrating one embodiment of a process 400 for calculating a weighted score for a candidate document. The calculate score process 400 (i.e., step 350 in FIG. 3) starts at step 402 and initializes a score (e.g., set score to zero) for the current candidate document. The process 400 proceeds to process each search term in the search expression in a do-loop starting at step 404. The process 400 then proceeds to process each weight criterion associated with the search term in another do-loop starting at step 406. For the current weight criterion being processed, the process 400 determines whether the current weight criterion is a counting criterion (i.e., a criterion associated with the number of occurrence of the search term) at step 408. If the current weight criterion is a counting criterion, the process 400 proceeds to count the number of occurrence of the current search term in the current candidate document in a do-loop defined by blocks 410 and 412. In one embodiment, the process 400 scans each word in the candidate document, and at each occurrence of the search term, a count for the search term is incremented by one. The count for the search term may be initially set to zero at the start of the do-loop defined by blocks 410 and 412. After tabulation of each occurrence of the search term in the candidate document, the process 400 proceeds to evaluate the criterion at step 414. Details of the evaluate criterion process or subroutine (step 414) is detailed below with reference to FIG. 5.

FIG. 5 is a table illustrating one embodiment of an evaluate criterion process 500. The evaluate criterion process 500 first determines the type of weight criterion to be evaluated from the selections listed in the left column 510 and determines whether the weight criterion is satisfied in the candidate document (i.e., whether the Boolean expression representing the weight criterion is true) as described in the right column 520. The counting criteria includes PRESENCE, MULTIPLES, and MINIMUM(n)), and the evaluate criterion process 500 utilizes the search term occurrence count resulting from step 412 to determine whether the occurrence count satisfies the counting criterion currently being evaluated.

For the counting criterion PRESENCE (block 522), the process 500 returns a Boolean result of "true" if the occurrence count is at least one (block 524), and a subscore is calculated based on the value of the score modifier. In one embodiment, the weight value or score modifier is set to a numerical value (e.g., two), and the score for having the search term present at least once equals the numerical value (e.g., two).

For the counting criterion MULTIPLES (block 526), the process 500 returns a Boolean result of "true" if the occurrence count is greater than one (block 528), and a subscore is calculated based on the value of the score modifier multiplied by the occurrence count. In one embodiment, the weight value or score modifier is set to a numerical value (e.g., one), and the score for having the search term present more than once equals the weight value (e.g., one) multiplied by the value of the occurrence count. Consider, for example, utilizing the following search expression: Mayflower(MULTIPLES:2).

In this case, the candidate document would receive 2 points for each occurrence of the search term "Mayflower".

For the counting criterion MINIMUM(n) (block 532), the process 500 returns a Boolean result of "true" if the occurrence count is greater than or equal to the value of n (block 528), and a subscore is calculated based on the value of the score modifier. In one embodiment, the score for having the search term present at least n times equals the designated weight value (e.g., five). Consider, for example, utilizing the following search expression: Mayflower(MINIMUM(5):10) Pilgrim(MINIMUM(3):10).

In this case, the candidate document would receive 10 points for having at least five occurrences of the search term "Mayflower" and 10 points for having at least three occurrences of the search term "Pilgrim".

Referring back to FIG. 4, after evaluating the criterion at step 414, if the Boolean result is true (block 416), a calculated subscore is added to a subtotal for the score of the candidate document at block 418. In one embodiment, the subscore and the search term/criterion may be stored in memory and presented to the user with the results list (i.e., hit list) of candidate documents.

After the subscore has been added to the subtotal for the score of the candidate document, the process 400 returns to block 406 to process the next weight criterion associated with the search term. If all weight criteria have been processed, the process 400 returns to block 404 to process the next search term. If all search terms have been processed, the process 400 ends at step 490 and returns to the main routine (process 300) at step 340 to calculate score for the next candidate document.

Referring back to block 408, if the weight criterion is not a counting criterion (e.g., a usage criterion or a format criterion), the process 400 proceeds to determine whether the current document satisfies the weight criterion (i.e., a Boolean expression) through the do-loop starting from block 420. In one embodiment, the process 400 scans each word in the candidate document, and at each occurrence of the search term (block 420), each weight criterion associated with the search term is evaluated for a Boolean result through a do-loop defined by blocks 422, 424, and 426. For each weight criterion associated with the search term (block 422), the process 400 evaluates the criterion (utilizing evaluate criterion process/subroutine 500) at step 424, and accumulates a cumulative Boolean result at step 426. The cumulative Boolean result is utilized in subsequent steps to determine the subscore to be added to the subtotal for the score of the candidate document.

Referring to FIG. 5, the non-counting criteria generally include the location criteria and the format criteria. The following description utilizes examples applicable to electronic documents utilizing HTML (Hypertext Markup Language) format and its extensions. However, it is understood that embodiments of the invention may be applicable to other formats of electronic data.

For the weight criterion BOLD (block 536), the process 500 returns a Boolean result of "true" if the found search term has bold formatting in the candidate document (block 538). In one embodiment, the process 500 searches backwards (i.e., from the found search word) through the text of the candidate document for bold mark-up tags or indicators of bold font settings. The search for bold mark-up tags may be halted if the number of words encountered in the backward search exceeds a designated bold proximity word limit constant (e.g., a default setting of 20 words) before the bold markup tags are found. Also, the search for bold mark-up tags may be halted if an end bold mark-up is found or if other tags that would end a bold mark-up, such as section tags (e.g., title, header, or paragraph tags), are found. If the search is halted, the process 500 returns a Boolean result of "false" (or if the default Boolean result is set as "false," the process 500 proceeds to process the next criterion). If the bold mark-up tags are found, the process 500 returns a Boolean result of "true" to be accumulated in step 426. In some systems, the found search term in the candidate document may provide information regarding its format, and the process 500 may determine whether the found search term has a bold format setting based on this information.

For the weight criterion ITALIC (block 542), the process 500 returns a Boolean result of "true" if the found search term has italic formatting in the candidate document (block 544). In one embodiment, the process 500 searches backwards (i.e., from the found search word) through the text of the candidate document for italic mark-up tags or indicators of italic font settings. The search for italic mark-up tags may be halted if the number of words encountered in the backward search exceeds a designated italic proximity word limit constant (e.g., a default setting of 20 words) before the italic mark-up tags are found. Also, the search for italic mark-up tags may be halted if end italic mark-up is found or if other tags that would end an italic mark-up, such as section tags (e.g., title, header, or paragraph tags), are found. If the search is halted, the process 500 returns a Boolean result of "false" (or if the default Boolean result is set as "false," the process 500 proceeds to process the next criterion). If the italic mark-up tags are found, the process 500 returns a Boolean result of "true" to be accumulated in step 426.

For the weight criterion COLOR (block 546), the process 500 returns a Boolean result of "true" if the found search term has a different text or background color than a common text color or a common background color of the paragraph containing the found search term or the text in the candidate document (block 548). In one embodiment, the process 500 determines the text color and the background color of the found search term and one or more common text colors and/or common background colors of the paragraph or the text in the candidate document. A common color (either text color or background color) may be defined as a color used by at least a certain percentage, e.g., 20%, of the paragraph having the found search term or at least a certain percentage, e.g., 20%, of the text in the candidate document. The text color and the background color of the found search term is compared to the determined common text and background colors, respectively, and if the found search term has a different text or background color than the common text or background colors of the paragraph or the text in the candidate document, the process 500 returns a Boolean result of "true" to be accumulated in step 426.

For the weight criterion FONTSIZE (block 552), the process 500 returns a Boolean result of "true" if the found search term has a different font size than the common font size of the paragraph containing the found search term or the text in the candidate document (block 554). In one embodiment, the process 500 determines the font size of the found search term and one or more common font sizes of the paragraph or the text in the candidate document. A common font size may be defined as the font size used by at least a certain percentage, e.g., 20%, of the paragraph having the found search term or at least a certain percentage, e.g., 20%, of the text in the candidate document. The font size of the found search term is compared to the determined common font sizes, and if the found search term has a different font size than the determined common font sizes of the paragraph or the text in the candidate document, the process 500 returns a Boolean result of "true" to be accumulated in step 426.

For the weight criterion FONTFACE (block 556), the process 500 returns a Boolean result of "true" if the found search term has a different font face or type than the common font face of the paragraph containing the found search term or the text in the candidate document (block 558). In one embodiment, the process 500 determines the font face of the found search term and one or more common font faces of the paragraph or the text in the candidate document. A common font face may be defined as the font face used by at least a certain percentage, e.g., 20%, of the paragraph having the found search term or at least a certain percentage, e.g., 20%, of the text in the candidate document. The font face of the found search term is compared to the determined common font faces, and if the found search term has a different font face than the common font faces of the paragraph or the text in the candidate document, the process 500 returns a Boolean result of "true" to be accumulated in step 426.

For the weight criterion HEADER (block 562), the process 500 returns a Boolean result of "true" if the found search term is located in a header section of the candidate document (block 564). In one embodiment, the process 500 searches backwards (i.e., from the found search word) through the text of the candidate document for a header mark-up tag. The search for header mark-up tags may be halted if an end header mark-up tag is found. If a header mark-up tag is found, the process 500 returns a Boolean result of "true" to be accumulated in step 426.

For the weight criterion CAPTION (block 566), the process 500 returns a Boolean result of "true" if the found search term is located in a caption section of the candidate document (block 568). In one embodiment, the process 500 searches backwards (i.e., from the found search word) through the text of the candidate document for a caption mark-up tag. If a caption mark-up tag is found, the process 500 returns a Boolean result of "true" to be accumulated in step 426. Alternatively, the process 500 may determine whether the found search term in contained in an alternate image text, and if so, the process 500 returns a Boolean result of "true" to be accumulated in step 426.

For the weight criterion ABSTRACT (block 572), the process 500 returns a Boolean result of "true" if the found search term is located in an abstract section of the candidate document (block 574). In one embodiment, the process 500 determines whether the found search term is located in a paragraph following a header containing the word "abstract" or in a paragraph having the word "abstract" located at the beginning of the paragraph (e.g., first three words of the paragraph). Alternatively, the process 500 determines whether the found search term is located in an abstract meta-data (i.e., a description of abstract data or data included with an electronic document which provides keywords, bibliographic information and/or abstract about the electronic document) of the candidate document. If the found search term is located in an abstract section of the candidate document, the process 500 returns a Boolean result of "true" to be accumulated in step 426.

For the weight criterion FOOTNOTE (block 576), the process 500 returns a Boolean result of "true" if the found search term is located in a footnote section of the candidate document (block 578). In one embodiment, the process 500 searches backwards (i.e., from the found search word) through the text of the candidate document for a footnote mark-up tag. If a footnote mark-up tag is found, the process 500 returns a Boolean result of "true" to be accumulated in step 426.

For the weight criterion SUMMARY (block 582), the process 500 returns a Boolean result of "true" if the found search term is located in a summary section of the candidate document (block 584). In one embodiment, the process 500 determines whether the found search term is located in a paragraph following a header containing the word "summary" or in a paragraph having the word "summary" located at the beginning of the paragraph (e.g., first three words of the paragraph). If so, the process 500 returns a Boolean result of "true" to be accumulated in step 426.

For the weight criterion TITLE (block 586), the process 500 returns a Boolean result of "true" if the found search term is located in a title section of the candidate document (block 588). In one embodiment, the process 500 searches backwards (i.e., from the found search word) through the text of the candidate document for a title mark-up tag. If a title mark-up tag is found, the process 500 returns a Boolean result of "true" to be accumulated in step 426. Alternatively, the process 500 determines whether the found search term is located in a title meta-data (i.e., a description of title data or data included with an electronic document which provides keywords, bibliographic information and/or abstract about the electronic document) of the candidate document. If the found search term is located in a title section of the candidate document, the process 500 returns a Boolean result of "true" to be accumulated in step 426.

Referring back to FIG. 4, after the Boolean result is accumulated in step 428, the process 400 returns to block 422 to process the next criterion. After all weight criteria associated with the current search term have been evaluated, the process 400 proceeds to block 428 to determine whether the Boolean expression defined by the weight criterion has been satisfied (i.e., all Boolean results are true). If so, a subscore is calculated based on the weight value and added to a subtotal for the score of the candidate document at block 430, and the process 400 returns to block 420 to process the next occurrence of the search term. Consider, for example, utilizing the following search expression:
Mayflower(BOLD:2;ITALIC:2).

In this case, the candidate document would receive 2 points for having the search term "Mayflower" in either bold or italic format and 4 points for having the search term "Mayflower" in both bold and italic format.

Referring back to block 428, if the Boolean expression defined by the weight criterion has not been satisfied (i.e., one or more Boolean results are false), the process 400 returns to block 420 to process the next occurrence of the search term in the candidate document. After all instances of the search term in the candidate document have been processed, the process 400 returns to block 406 to process the next weight criterion associated with the search term. After all weight criteria for the current search term have been processed, the process 400 returns to block 404 to process the next search term and the associated weight criteria. After all search terms have been processed, the process 400 ends at step 490 and returns to the main routine (process 300) at step 340 to calculate score for the next candidate document. As described above with reference to FIG. 3, after all candidate documents have been processed, the results of the weighted search are presented to the user.

While the foregoing is directed to embodiments of the present invention, other and further embodiments of the invention may be devised without departing from the basic scope thereof, and the scope thereof is determined by the claims that follow.

What is claimed is:

1. A method for searching electronic documents, comprising:
   receiving a search expression including one or more search terms each having one or more weighting criteria each comprising a weight criterion and a corresponding user-designated score modifier applicable to the respective weight criterion, wherein the one or more weight criterions each describe a characteristic that the respective search term must satisfy with respect to candidate documents and wherein the corresponding user-designated score modifier provides a user-designated weight to the respective weight criterion;
   finding one or more candidate documents based on the search expression;
   calculating a score for each candidate document according to the one or more weight criteria; and
   preparing a list of the one or more candidate documents reflecting the calculated scores.

2. The method of claim 1, further comprising:
   sorting the one or more candidate documents according to the calculate scores.

3. The method of claim 1, further comprising:
   presenting a subscore for each search term having a weight criterion.

4. The method of claim 1, wherein the weight criterions are selected from a location of the one or more search terms, a format of the one or more search terms, and a frequency count of the one or more search terms.

5. The method of claim 1, wherein the weight criterions require that the one or more search terms are located in a section selected from a header section, a caption section, an abstract section, a footnote section, a summary section, and a title section.

6. The method of claim 1, wherein the weight criterions require that the one or more search terms have a different format than a common format of a paragraph containing the one or more search terms.

7. The method of claim 6, wherein the format is selected from bold, italic, color, font size and font type.

8. The method of claim 1, wherein the weight criterions require that a search term be present in the candidate document at least a minimum number of times.

9. The method of claim 1, further comprising:
   sorting the one or more candidate documents according to the weight criteria.

10. A signal bearing medium, comprising a program which, when executed by a processor, performs an operation, comprising:
    receiving a search expression including one or more search terms each having one or more weight criteria each comprising a weight criterion and a corresponding user-designated score modifier applicable to the respective weight criterion, wherein the one or more weight criterions each describe a characteristic that the respective search term must satisfy with respect to candidate documents and wherein the corresponding user-designated score modifier provides a user-designated weight to the respective weight criterion;
    finding one or more candidate documents based on the search expression;
    calculating a score for each candidate document reflecting the one or more weight criteria; and
    preparing a list of the one or more candidate documents reflecting the calculated scores.

11. The signal bearing medium of claim 10, wherein the program which, when executed by a processor, further performs the step of sorting the one or more candidate documents according to the calculate scores.

12. The signal bearing medium of claim 10, wherein the program which, when executed by a processor, further performs the step of presenting a subscore for each search ten having a weight criterion.

13. The signal bearing medium of claim 10, wherein the weight criterions are selected from a location of the one or more search terms, a format of the one or more search terms, and a frequency count of the one or more search terms.

14. The signal bearing medium of claim 10, wherein the weight criterions require that the one or more search terms are located in a section selected from a header section, a caption section, an abstract section, a footnote section, a summary section, and a title section.

15. The signal bearing medium of claim 10, wherein the weight criterions require that one or more search terms have a different format than a common format of the candidate document.

16. The signal bearing medium of claim 15, wherein the different format is selected from bold, italic, color, font size and font type.

17. The signal bearing medium of claim 15, wherein the weight criterions require that a search term be present in the candidate document at least a minimum number of times.

18. A system for searching electronic documents, comprising:
a memory containing a search engine; and
a processor which, when configured with the search engine, performs an operation, comprising:
receiving a search expression including one or more search terms each having one or more weight criteria each comprising a weight criterion and a corresponding user-designated score modifier applicable to the respective weight criterion, wherein the one or more weight criterions each describe a characteristic that the respective search term must satisfy with respect to candidate documents and wherein the corresponding user-designated score modifier provides a user-designated weight to the respective weight criterion;
finding one or more candidate documents based on the search expression;
calculating a score for each candidate document reflecting the one or more weight criteria; and
preparing a list of the one or more candidate documents reflecting the calculated scores.

19. The system of claim 18, wherein the search engine is further configured to perform the step of sorting the one or more candidate documents according to the calculate scores.

20. The system of claim 18, wherein the search engine is further configured to perform the step of presenting a subscore for each search term having a weight criterion.

21. The system of claim 18, wherein the weight criterions are selected from a location of the one or more search terms, a format of the one or more search terms, and a frequency count of the one or more search terms.

22. The system of claim 18, wherein the weight criterions require that one or more search terms have a different format than a common format of the candidate document.

23. The system of claim 22, wherein the different format is selected from bold, italic, color, font size and font type.

24. The system of claim 18, further comprising a database containing one or more candidate documents.

25. The system of claim 18, further comprising a network connection with a client computer from which the search expression is received.

26. A method for searching electronic documents, comprising:
receiving a search expression including one or more search terms having one or more weighting criteria each comprising a format criterion and a corresponding user-designated score modifier applicable to the respective format criterion, wherein the format criterions each describe a characteristic that the respective search term must satisfy with respect to candidate documents and wherein the corresponding user-designated score modifier provides a user-designated weight to the respective format criterion;
finding one or more candidate documents based on the search expression;
calculating a score for each candidate document according to the one or more weighting criteria; and
preparing a list of the one or more candidate documents reflecting the calculated scores.

27. The method of claim 26, wherein the one or more format criterions require that the respective one or more search terms have a different format than a common format of a paragraph containing the respective one or more search terms.

28. The method of claim 26, wherein the one or more format criterions are selected from bold, italic, color, font size and font type.

29. The method of claim 26, further comprising:
sorting the one or more candidate documents according to the calculate scores.

30. The method of claim 26, further comprising:
presenting a subscore for each search term having a respective format criterion.

31. The method of claim 26, wherein the search expression includes one or more search terms having one or more weight criterions selected from:
a location criterion requiring that the respective search terms are located in a section selected from a header section, a caption section, an abstract section, a footnote section, a summary section, and a title section; and
a frequency count requiring that the respective search terms be present in the candidate document at least a minimum number of times.

32. A method for searching electronic documents, comprising:
receiving a search expression including one or more search terms;
finding a plurality of candidate documents based on the search expression;
calculating a format score for each candidate document wherein the format scores reflect formatting attributes applied to the one or more search terms, wherein the formatting attributes comprise a formatting criterion and a corresponding user-designated score modifier applicable to the respective formatting criterion, wherein the one or more formatting criterions each describe a formatting characteristic that the respective search term must satisfy with respect to candidate documents and wherein the corresponding user-designated score modifier provides a user-designated weight to the respective formatting criterion; and
sorting the candidate documents to produce a list having a document order at least partially reflecting the calculated format scores.

33. The method of claim 32, wherein the formatting attributes require that the one or more search terms have a different format than a common format of a paragraph containing the one or more search terms.

34. The method of claim 32, wherein the formatting attributes are selected from the group consisting of a font type, a font size, a font color, a background color, a bold type style, and an italic type style.

35. The method of claim 32, wherein the formatting attributes include a location of the one or more search terms within the candidate document.

36. The method of claim 32, wherein the formatting attributes include whether the one or more search terms are located in a section selected from the group consisting of a header section, a caption section, an abstract section, a footnote section, a summary section, and a title section.

37. The method of claim 32, wherein the document order at least partially reflects a frequency count of the one or more search terms within the candidate document.

* * * * *